United States Patent
Perry

(10) Patent No.: US 8,162,131 B2
(45) Date of Patent: Apr. 24, 2012

(54) FLIGHT BAR WITH REPLACEABLE END

(75) Inventor: Rick L. Perry, Meridian, MS (US)

(73) Assignee: Southern Cast Products, Inc., Meridian, MS (US)

( * ) Notice: Subject to any disclaimer, the term of this patent is extended or adjusted under 35 U.S.C. 154(b) by 219 days.

(21) Appl. No.: 12/686,603

(22) Filed: Jan. 13, 2010

(65) Prior Publication Data

US 2011/0168528 A1     Jul. 14, 2011

(51) Int. Cl.
    B65G 19/24    (2006.01)
(52) U.S. Cl. ........................................................ 198/731
(58) Field of Classification Search .................. 198/728, 198/730, 731, 734
    See application file for complete search history.

(56) References Cited

U.S. PATENT DOCUMENTS

| | | | |
|---|---|---|---|
| 3,522,875 A | 8/1970 | Smerd | |
| 3,587,831 A | 6/1971 | Temme | |
| 3,902,591 A | 9/1975 | Temme | |
| 3,955,666 A | 5/1976 | Braun | |
| 4,113,084 A * | 9/1978 | Temme | 198/731 |
| 4,505,379 A | 3/1985 | Temme | |
| 4,573,565 A | 3/1986 | Braun | |
| 4,600,097 A | 7/1986 | Temme | |
| 4,747,481 A | 5/1988 | Gorlov | |
| 4,790,425 A * | 12/1988 | Braun et al. | 198/731 |
| 4,815,586 A | 3/1989 | Heising | |
| 5,046,601 A | 9/1991 | Burdon | |
| 5,069,328 A | 12/1991 | Schiipphaus | |
| 5,170,882 A | 12/1992 | Tekathen | |
| 5,249,664 A * | 10/1993 | Steinkuhl | 198/731 |
| 5,495,934 A | 3/1996 | Tekathen | |
| 5,579,896 A | 12/1996 | Braun | |
| 5,605,220 A | 2/1997 | Krohm | |
| 5,699,895 A * | 12/1997 | Materne et al. | 198/731 |
| 5,725,084 A * | 3/1998 | Jager | 198/848 |
| 6,595,351 B2 * | 7/2003 | Malitzki | 198/731 |
| 7,159,707 B2 * | 1/2007 | Malitzki et al. | 198/731 |

FOREIGN PATENT DOCUMENTS

| | | |
|---|---|---|
| DE | 3300884 | 7/1984 |
| DE | 3316733 | 11/1984 |
| DE | 3324109 | 1/1985 |
| DE | 3525984 | 1/1987 |
| DE | 3535361 | 4/1987 |
| EP | 079192 | 5/1983 |
| EP | 078656 | 11/1983 |
| EP | 0273595 | 7/1988 |

* cited by examiner

*Primary Examiner* — Douglas Hess
(74) *Attorney, Agent, or Firm* — Bradley Arant Boult Cummings LLP

(57) ABSTRACT

An apparatus for extending the wear life of flight bars used in chain-driven scraper conveyor systems by using a replaceable bar end. The bar end is securely attached to the flight bar body by a tongue protruding through an aperture in the bar end and interlocking with the clamp that secures the flight bar to the drive chain, without the use of additional fasteners. The replaceable bar end may be made from a different material than the body of the flight bar. Therefore, a wear resistant material could be used for the bar end, with the bar body and clamp made from conventional, typically more ductile materials. This invention therefore allows for the flight bar end to be replaced as required saving the cost of the main flight bar body and clamp.

14 Claims, 2 Drawing Sheets

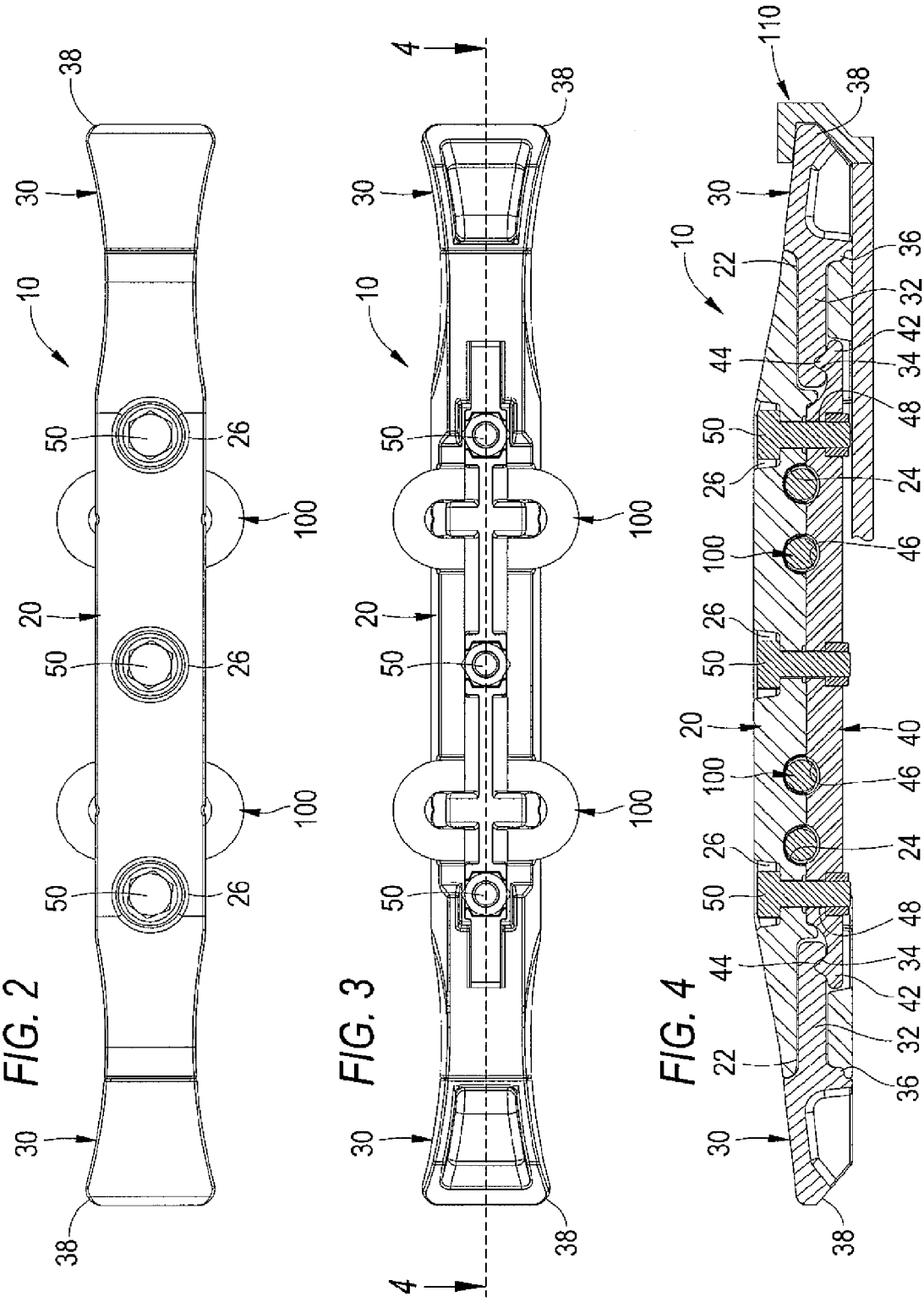

FLIGHT BAR WITH REPLACEABLE END

TECHNICAL FIELD

The invention relates generally to flight bars used in scraper conveyors in the mining industry, and more specifically to a flight bar having replaceable flight bar ends so that they can be readily replaced as the bar ends wear without having to replace the flight bar body itself.

BACKGROUND

It is common in longwall mining to transport the cut coal from the shearing face of the seam by way of a so-called armored face conveyor or "AFC" in order to move high tonnages of coal from the area of the mining machine to a main conveyor belt and then out of the mine. A typical AFC is made up of a number of interconnected line pans having profiled side channel guides, commonly referred to as "sigma sections", so named due to the close similarity of their cross-sectional configuration with that of the capital Greek letter. A plurality of elongated flight bars, interconnected by one or two continuous chains, lie transverse across the conveyor and slide along the flight pans to move the cut coal therein. The ends of the flight bars are specially profiled to slidably fit within the contoured sigma sections of the line pans and are guided with minimum friction therein, while wedging of material is also minimized. The flight bars are dragged along the line pan by the attached endless chains which, in turn, are driven by powerful motors.

As can be appreciated, there is a great deal of sliding contact between the profiled ends of the flight bars and the similarly contoured and closely fitting sigma sections of the line pans. After a period of time, the end portions of the flight bars become worn down to a degree that excessive clearances develop between the flight bar end portions and the sigma sections and the required guidance provided by the sigma sections is no longer present. When this condition develops, the worn flight bars shift and misalign which can cause line breakage and equipment shut-down if the problem is not corrected.

It has been common practice in the coal mining industry to remove and scrap the worn flight bars and replace them with flight bars in a newly manufactured condition. Needless to say, this is an expensive practice which has received some considerable attention in the past, but has yet to be rectified in a quick efficient manner until the present invention.

Prior attempts to repair worn flight bars have not proved entirely successful. One such repair method proposed to build-up or reconstruct the worn bar ends by hardforming, that is, by direct weld deposition on the worn areas of the flight bar. If the amount of deposited weld material becomes too great in certain areas, it has been found that the hardness of the surface coating will vary, which proves troublesome due to differential wearing. It is also very expensive and difficult to duplicate the complex surface profile geometry of the original flight bar tip by welding or hardforming. When the original bar-end profile is not duplicated to a substantial degree, the repaired flight bar will cause objectionable increased wear or jamming in the profiled sigma sections of the line pans. Hence, the desired smooth running chain scraper operation will not be realized.

Other attempts to provide replaceable flight bar ends utilize a dedicated set of fasteners to attach the bar ends to the flight bar. Such a construction increases the number of parts that must be used, the likelihood that a nut or bolt could be dropped or lost during replacement, and, in some designs, places considerable stress on the fastener itself.

The present invention solves the problems previously encountered by providing a replaceable bar end having substantially the same outer profile as the original design that can be quickly replaced without welding or cutting off the existing bar end, and which is secured to the flight bar body using the same fasteners that secure the bar body to the chain. Furthermore, because the replaceable bar end is mechanically attached to the body it can be produced out of the most desirable material and can have different mechanical properties and chemistry than those of the material used for the flight bar body, without the restriction of it being a weldable material. Such mechanical properties include tensile yield, elongation, reduction of area, and hardness, and specific chemistries utilized to affect the mechanical properties are generally known in the art. This allows the selection of a highly wear resistant material for the bar end.

SUMMARY

Embodiments of the present invention satisfy these needs. One embodiment of the present invention comprises a flight bar including a flight bar body, at least one replaceable bar end, a clamp, and fasteners for securing said clamp to said bar body. The bar end comprises a profiled scraping portion on its outer end and a tongue projecting laterally inwardly towards the flight bar body. The clamp comprises grooves adapted to fit a link of the chain that the flight bar is used with on a scraper conveyor. The clamp also includes an end portion adapted to interlock with the tongue of the bar end. The tongue of the bar end may have a recess and the end portion of the clamp may have a projection that interlocks with the recess. The projection may be formed in the shape of a wedge, with the recess of a complementary shape, which facilitates a tight fit as the parts are fastened together. The bar body comprises grooves complementary to the grooves on the clamp. At least one end of the bar body includes an aperture through which the tongue of the bar end extends into engagement with the end portion of said clamp. The clamp and the bar body are secured together with fasteners. When the clamp is secured to the bar body, the bar end and the chain are fixed to the bar body. As a result of this structure, the bar end is fixed to said bar body without the use of a fastener extending through said bar end. That is, the same set of fasteners fix both the chain and the bar end to said flight bar, such that no hardware beyond that used to fix the bar body to the chain is required to fix the bar end to the bar body. Preferably, the bar end is made of a material that is more wear resistant than the bar body and therefore can possess different mechanical properties and chemistry as needed to enhance wear life.

BRIEF DESCRIPTION OF THE DRAWINGS

The present invention will be explained, by way of example only, with reference to certain embodiments and the attached Figures, in which:

FIG. 2 is a top view of the embodiment shown in FIG. 1;

FIG. 3 is a bottom view of the embodiment shown in FIG. 1; and

FIG. 4 is a side sectional view of the embodiment shown in FIG. 1, also showing a portion of the side of a typical scraper conveyor.

DETAILED DESCRIPTION

Figure 1:
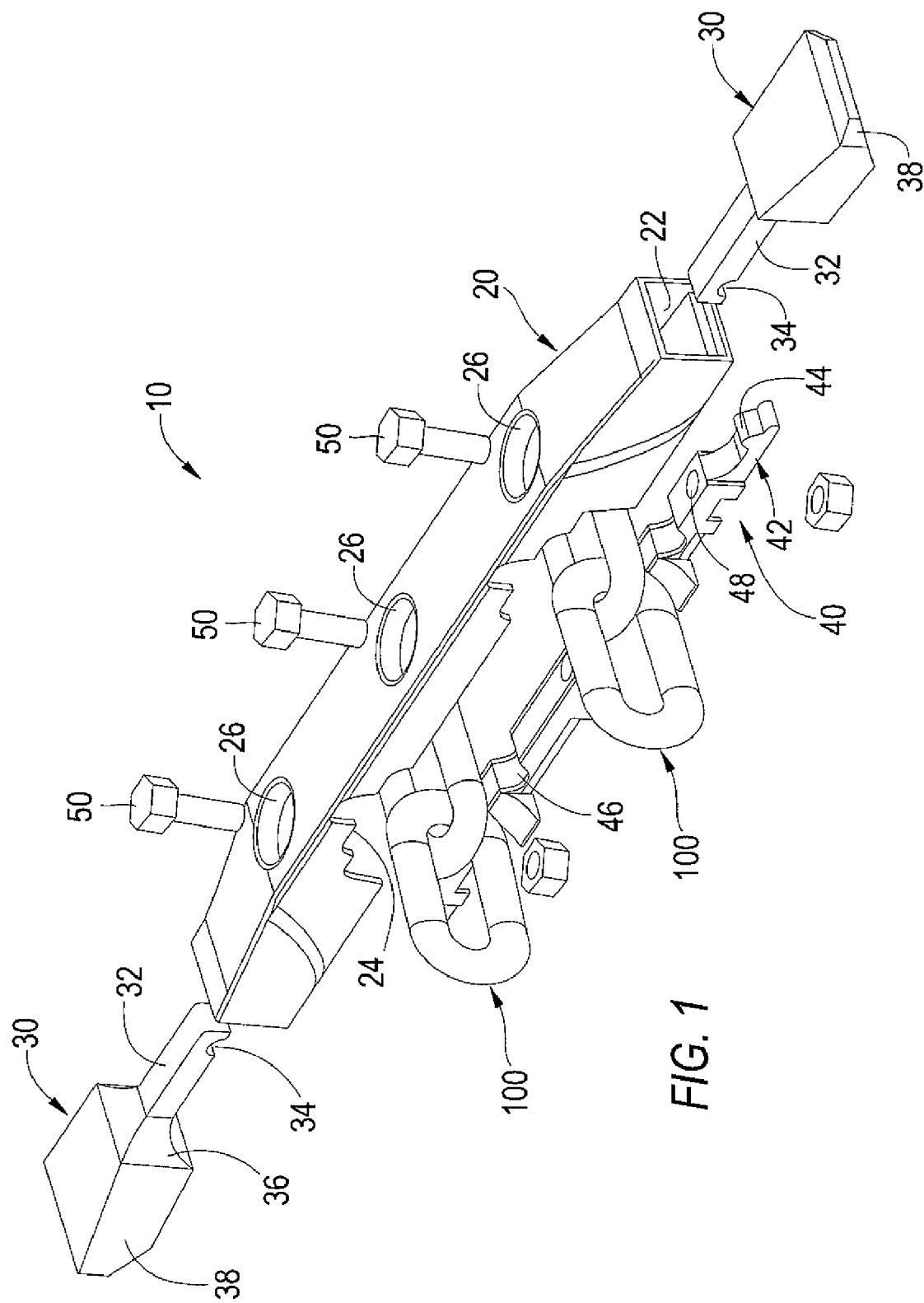
FIG. 1 is an exploded perspective view of one embodiment of the invention.

Referring to FIGS. 1-4, one embodiment of the present invention is a flight bar 10 comprising an elongate bar body 20 with at least one replaceable bar end 30 (two bar ends 30 are shown in FIGS. 1-4, and the invention will be described herein with respect to an embodiment having a replaceable bar end on either end of the bar body), a clamp 40, and fasteners 50 for securing a chain 100 between the clamp 40 to the bar body 20. As described in more detail below, the cooperation between the bar ends, the bar body and the clamp allows the same fasteners that secure the bar body to the chain to also secure the replaceable bar ends 30 to the bar body.

The bar ends 30 have a profiled scraping tip 38, which is sized and shaped to fit the profile of the edges of the scraper conveyor 110 (FIG. 4) on which the flight bar is intended to be used. It should be noted that the shape of the scraping portion 38 shown in FIGS. 1-4 is exemplary and any shape necessary to accommodate the profile of a given conveyor can be used. In fact, it is contemplated that a bar body 20 could be transferred to a conveyor with a different profile merely by changing the bar ends 30. Each bar end 30 also includes a tongue 32 that extends through an opening or aperture 22 in the end of the bar body 20 and interlocks with the clamp 40. In a preferred embodiment, the bar end 30 includes a tapered shoulder 36 between the scraping portion 38 and the tongue 32, and the aperture 22 in the bar body 20 terminates in an enlarged chamber 22 which is sized and shaped to fit the shoulder 36 of the bar end 30.

The clamp 40 fits generally underneath the bar body 20 and is secured to the bar body 20 with one or more fasteners 50, which in one embodiment pass through bores 26 and 48 in the bar body and clamp, respectively. In the embodiment shown in FIGS. 1-4, the fasteners are illustrated as bolts secured with a nut. Other means of fastening the clamp to the bar body can also be used. For example, the clamp 40 may include integrally formed threaded studs projecting upward from the clamp through the bores in the bar body, with nuts secured onto the stud and seated against the bar body. In such a configuration, the clamp 40 would not include bores. Alternatively, the clamp could include bores that are threaded, such that a screw may extend through the bar body and thread directly into the clamp.

The clamp 40 includes an end portion 42 adapted to interlock with the tongue 32 of the bar end 30. As shown in FIGS. 1-4, the tongue 32 comprises a female indention or recess 34 and the end portion 42 includes a complementary male projection 44. However, any suitable interlocking mechanism could be used. Thus, the bar end 30 is held in position at the end of the bar body 20 by the insertion of the tongue within the aperture 22 and by interlocking with the end portion 42 of the clamp 40. In a preferred embodiment, the male projection 44 is sloped to form a wedge, with the female recess 34 having a complementary shape adapted to receive the wedge, such that as the two pieces are pulled together vertically, the wedging action pulls the bar end inwardly into bar body laterally, providing a very secure and tight fit.

The clamp 40 includes grooves 46 that are adapted to fit the links of the chain 100 in the conveyor system with which the flight bar 10 is to be used. The bar body 20 has complementary grooves 24 aligned with those on the clamp 40. The chain 100 is fixed between the clamp 40 and the bar body 20 when those two components are secured together with fasteners 50. With the tongue 32 of the bar end 30 extending through the aperture 22 and engaged with the end portion 42 of the clamp 40, the bar end 30 is secured to the bar body 20 as the clamp 40 is tightened into the bar body 20 with the same fasteners 50 that secure the chain 100 to the bar body 20 and clamp 40. No additional fasteners are necessary to secure the bar ends 30 to the bar body and clamp 40.

An additional advantage of this construction is that the bar ends can be removed and replaced without entirely removing any fastening hardware from the assembled unit. First, there are no pins, bolts, or screws going through the bar end 30 itself. The manner in which the tongue 32 of the bar end 30 interlocks with the clamp 40 allows the bar end 30 to be removed by only loosening the fasteners between the clamp 40 and the bar body 20. The clamp 40 does not have to be entirely separated from the bar body 20. The conditions in which flight bars are used, in a mine, are often crowded with low clearances and may not be conducive to maintenance. The ability to replace the bar end 30 without disassembling the unit or removing fasteners under these conditions is advantageous because it allows replacement of a bar end 30 without disconnecting the fasteners or disassembling the unit and minimizes the chances of a lost part during maintenance or replacement.

The foregoing construction allows the bar ends to be made of a different material than the bar body and clamp. The bar body and clamp are preferably made of a ductile structural type material, such as low alloy steel. The bar ends, however, which are in close contact with the sides of the conveyor pan during use, are subjected to greater wear than the bar body and clamp. Thus, a highly wear resistant material is desirable for the bar ends. Typically, highly wear resistant materials do not possess the mechanical properties required for use as the bar body and clamp. For example, the material used for the bar body and clamp will typically be more ductile than that desired for the bar end. The present invention, therefore, allows the bar ends to be made of a highly wear resistant material and the bar body and clamp to be made of ductile structural type material, such as low alloy steel.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A flight bar for use with a chain comprising links in a scraper conveyor, comprising:
   a flight bar body, at least one replaceable bar end, a clamp, and fasteners for securing said clamp to said bar body, wherein
   said bar end comprises a profiled scraping portion and a tongue;
   said clamp comprises grooves adapted to fit a link of said chain and an end portion adapted to interlock with said tongue;
   said bar body comprises grooves complementary to the grooves on the clamp and at least one end of said bar body comprising an aperture through which said tongue extends into engagement with the end portion of said clamp;
   said clamp and said bar body comprising bores for receiving said fasteners;
   whereby, when said clamp is secured to said bar body with said fasteners, said bar end and said chain are fixed to said bar body.

2. The flight bar of claim 1, wherein said tongue comprises a recess and said end portion of said clamp comprises a projection that interlocks with said recess.

3. The flight bar of claim 2, wherein said projection is wedge-shaped, and said recess is adapted to receive said wedge, such that as said projection is inserted into said recess as said clamp is tightened into said body, said bar end is pulled laterally inwardly into said bar body.

4. The flight bar of claim 1, wherein said scraping portion of said bar end further comprises a shoulder that tapers into said tongue, and wherein the aperture in said at least one end of said bar body terminates in a chamber for receiving said shoulder.

5. The flight bar of claim 1, wherein the bar end is made of a material that is more wear resistant than the bar body.

6. The flight bar of claim 1, wherein said bar end is fixed to said bar body without the use of a fastener extending through said bar end.

7. The flight bar of claim 1, wherein the fasteners fix both the chain and the bar end to said flight bar.

8. A flight bar with replaceable bar ends for use with a chain comprising links in a scraper conveyor, in which one set of fasteners is used to secure both said bar ends and said chain to said flight bar, said flight bar comprising:
  a flight bar body, at least one replaceable bar end, a clamp, and fasteners for securing said clamp and said bar end to said bar body, wherein
    said bar end comprises a profiled scraping portion and a tongue;
    said clamp comprises grooves adapted to fit a link of said chain and an end portion adapted to interlock with said tongue;
    said bar body comprises grooves complementary to the grooves on the clamp and at least one end of said bar body comprising an aperture through which said tongue extends into engagement with the end portion of said clamp; and
    said clamp and said bar body adapted to be secured together using said fasteners.

9. The flight bar of claim 8, wherein said tongue comprises a recess and said end portion of said clamp comprises a projection that interlocks with said recess.

10. The flight bar of claim 9, wherein said projection is wedge-shaped, and said recess is adapted to receive said wedge, such that as said projection is inserted into said recess as said clamp is tightened into said body, said bar end is pulled laterally inwardly into said bar body.

11. The flight bar of claim 8, wherein said scraping portion of said bar end further comprises a shoulder that tapers into said tongue, and wherein the aperture in said at least one end of said bar body terminates in a chamber for receiving said shoulder.

12. The flight bar of claim 8, wherein the bar end is made of a material that is more wear resistant than the bar body.

13. A flight bar with replaceable bar ends for use with a chain comprising links in a scraper conveyor said flight bar comprising a flight bar body, at least one replaceable bar end, a clamp, and fasteners for securing said clamp and said bar end to said bar body, wherein said bar end is secured to said clamp and bar body without a fastener passing through said bar end.

14. The flight bar of claim 13, wherein said bar end comprises a profiled
  scraping portion and a tongue, said clamp comprises an end portion adapted to interlock with said tongue, and at least one end of said bar body comprises an aperture through which said tongue extends into engagement with the end portion of said clamp.

* * * * *